(12) United States Patent
Sacks et al.

(10) Patent No.: US 9,043,235 B1
(45) Date of Patent: *May 26, 2015

(54) COMPUTING CLOUD SYSTEM FOR OBJECT SELECTION, OBJECT PICKING BY LINE, OBJECT LOADING AND OBJECT DELIVERY USING AN OBJECT LOCATION IDENTIFICATION TRIGGER

(71) Applicant: SYSTEMS APPLICATION ENGINEERING, INC., Houston, TX (US)

(72) Inventors: Jerry Dennis Sacks, Houston, TX (US); James Michael Parks, Houston, TX (US); Gregory Parker Braun, Houston, TX (US); Christopher Burks Parr, Houston, TX (US)

(73) Assignee: SYSTEMS APPLICATION ENGINEERING, INC., Houston, TX (US)

( * ) Notice: Subject to any disclaimer, the term of this patent is extended or adjusted under 35 U.S.C. 154(b) by 303 days.

This patent is subject to a terminal disclaimer.

(21) Appl. No.: 13/860,431

(22) Filed: Apr. 10, 2013

Related U.S. Application Data

(63) Continuation-in-part of application No. 13/159,054, filed on Jun. 13, 2011, which is a continuation-in-part of application No. 12/772,493, filed on May 3, 2010, now Pat. No. 7,991,654.

(51) Int. Cl.
*G06Q 10/00* (2012.01)
*G06K 7/10* (2006.01)
*G06K 9/22* (2006.01)
*G06K 3/02* (2006.01)
*G06Q 10/08* (2012.01)

(52) U.S. Cl.
CPC .................................. *G06Q 10/087* (2013.01)

(58) Field of Classification Search
USPC ............................................................ 705/28
See application file for complete search history.

(56) References Cited

U.S. PATENT DOCUMENTS

| | | | | |
|---|---|---|---|---|
| 6,026,378 | A  * | 2/2000  | Onozaki       | 705/28    |
| 7,991,654 | B1 * | 8/2011  | Sacks et al.  | 705/28    |
| 2002/0082954 | A1 * | 6/2002  | Dunston    | 705/28    |
| 2004/0128133 | A1 * | 7/2004  | Sacks et al. | 704/270  |
| 2004/0128134 | A1 * | 7/2004  | Sacks et al. | 704/270  |
| 2004/0133303 | A1 * | 7/2004  | Sacks et al. | 700/213  |
| 2004/0138781 | A1 * | 7/2004  | Sacks et al. | 700/245  |
| 2004/0181467 | A1 * | 9/2004  | Raiyani et al. | 705/28 |
| 2005/0284934 | A1 * | 12/2005 | Ernesti et al. | 235/385 |
| 2007/0083443 | A1 * | 4/2007  | Sacks et al.  | 705/28   |
| 2008/0097724 | A1 * | 4/2008  | Morris et al. | 702/187  |
| 2010/0271187 | A1 * | 10/2010 | Uysal et al.  | 340/10.4 |
| 2012/0310727 | A1 * | 12/2012 | Bradley et al. | 705/14.41 |
| 2013/0290106 | A1 * | 10/2013 | Bradley et al. | 705/14.64 |

* cited by examiner

*Primary Examiner* — Ashford S Hayles
(74) *Attorney, Agent, or Firm* — Buskop Law Group, PC; Wendy Buskop

(57) ABSTRACT

A cloud computing system for object location, object identification, object picking, object picking by line, object loading onto one or more transport devices, or object delivery that can include using a cloud based server comprising a cloud based processor in communication with a cloud based data storage. The cloud based server can be in communication with at least one mobile processor in communication with a mobile data storage and a display. The method can also include sending instructions to an operator from the cloud based computer to a mobile processor associated with an operator to instruct the operator to perform a logistics operation. The logistic operation can include one or more of object location, object identification, object picking, object picking by line, object loading onto one or more transport devices, and object delivery.

20 Claims, 13 Drawing Sheets

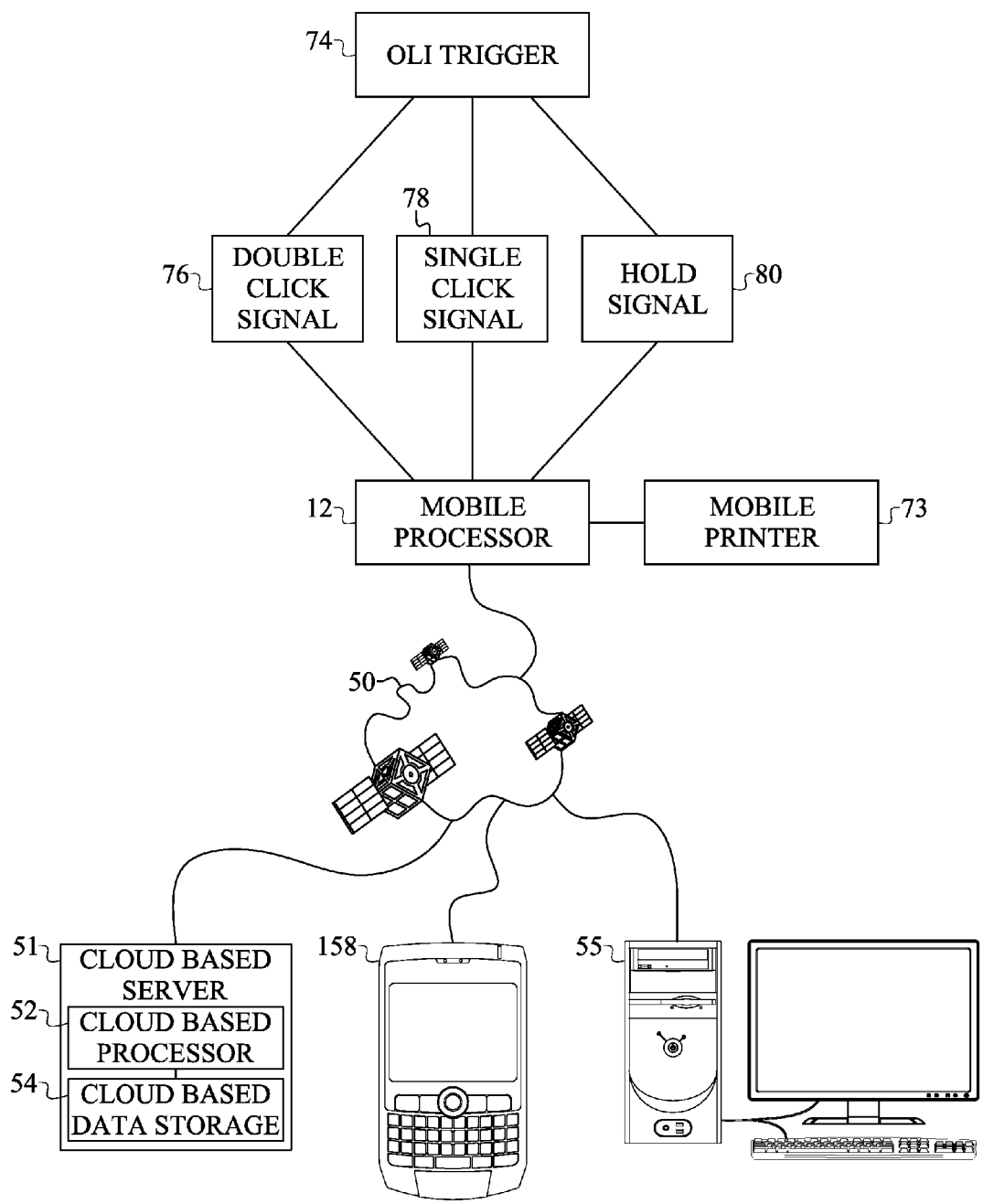

COMPUTING CLOUD SYSTEM FOR OBJECT SELECTION, OBJECT PICKING BY LINE, OBJECT LOADING AND OBJECT DELIVERY USING AN OBJECT LOCATION IDENTIFICATION TRIGGER

CROSS REFERENCE TO RELATED APPLICATIONS

The present application is a Continuation in Part application of U.S. patent application Ser. No. 13/159,054 filed Jun. 13, 2011, entitled "METHOD FOR OBJECT SELECTION, OBJECT PICKING BY LINE, OBJECT LOADING AND OBJECT DELIVERY USING AN OBJECT LOCATION IDENTIFICATION TRIGGGER", which is a continuation in part application of U.S. patent application Ser. No. 12/772,493 filed May 3, 2010, now issued as U.S. Pat. No. 7,991,654 on Aug. 2, 2011, entitled "SYSTEM FOR OBJECT SELECTION, OBJECT PICKING BY LINE, OBJECT LOADING AND OBJECT DELIVERY USING AN OBJECT LOCATION IDENTIFICATION TRIGGER." These applications are incorporated herein in their entirety.

FIELD

The present embodiments generally relate to a cloud computing system for performing logistical operations and a computer implemented method for object location, object identification, object picking, object picking by line, object loading onto one or more transport devices, or object delivery.

BACKGROUND

A need exists for a cloud computing based system and an improved method for going to an object location, identifying an object, picking an object, picking an object by line, loading and delivering an object, also often referred to in logistics operations using a cloud based server with a processor and a data storage in the computing cloud wherein the cloud based server communicates to a mobile processor with a mobile data storage and a very fast input device that provides clear unequivocal responses to commands from the mobile processor.

A need exists for system and a computer implemented method that can use a hand held fast reacting device to acknowledge an object location, an object identification, a loading device, a transport device, such as a transport vehicle and a delivery location, and the system must be extremely fast compared with speaking and require no computer training time.

A need exists for a cloud based computing system that can provide a few simple signals to a mobile processor that connects to a cloud based server for object tracking, object identification, object selection, object picking, object picking by line, object loading and delivery of objects.

A need exists for a cloud based computing system that supports the capture of data contained in a GSI DataBar (barcode) in order to improve the tracking, traceability, lot number, country of origin, product sell-by date, and expiration date during the object selection, object picking, object picking by line, object loading and object delivery processes.

A need exists for a cloud based system that can assist logistics companies with data collection for complying with the Foodservice GSI US Standards Initiative that is focused on reducing wastes in the supply chain, improvement of information for customers, and establishing a foundation for improving food safety.

A need exists for a cloud based computing system that can continuously and quickly receive, verify, and store various codes on objects and locations and delivery information for continuous and instantaneous use by an operator while the operator simultaneously provides simple signals from a simple hand held device that can be battery operated.

A need exists for a cloud based computing system with a portable component that communicates with a cloud based server that stores various libraries containing volumes of information on specific objects such as weights, sizes, colors; specific locations such as shelf height, or locations in a warehouse based on aisles; specific operators such as named individuals that can repeatedly handle grocery items versus household items; and specific transport devices, such as cart numbers, skid numbers, and transport vehicles, such as the large brown truck with the KROGER™ sign on it.

A need exists for a cloud based computing system where a cloud based server can transmit a list of objects, a list of delivery devices, a list of delivery vehicles, and a list of delivery locations to one or two different mobile processors for an operator with a first processor to continuously pick, or pick by line, load using an object location identification trigger. A second processor not in the computing cloud can be in communication with the first processor in the cloud based server to deliver objects safely, while maintaining efficiency and speed.

The present embodiments meet these needs.

BRIEF DESCRIPTION OF THE DRAWINGS

The detailed description will be better understood in conjunction with the accompanying drawings as follows:

FIG. 4 shows an embodiment of an object location identification trigger sending signals that can be used to perform one or more embodiments.

DETAILED DESCRIPTION OF THE EMBODIMENTS

Figure 1:
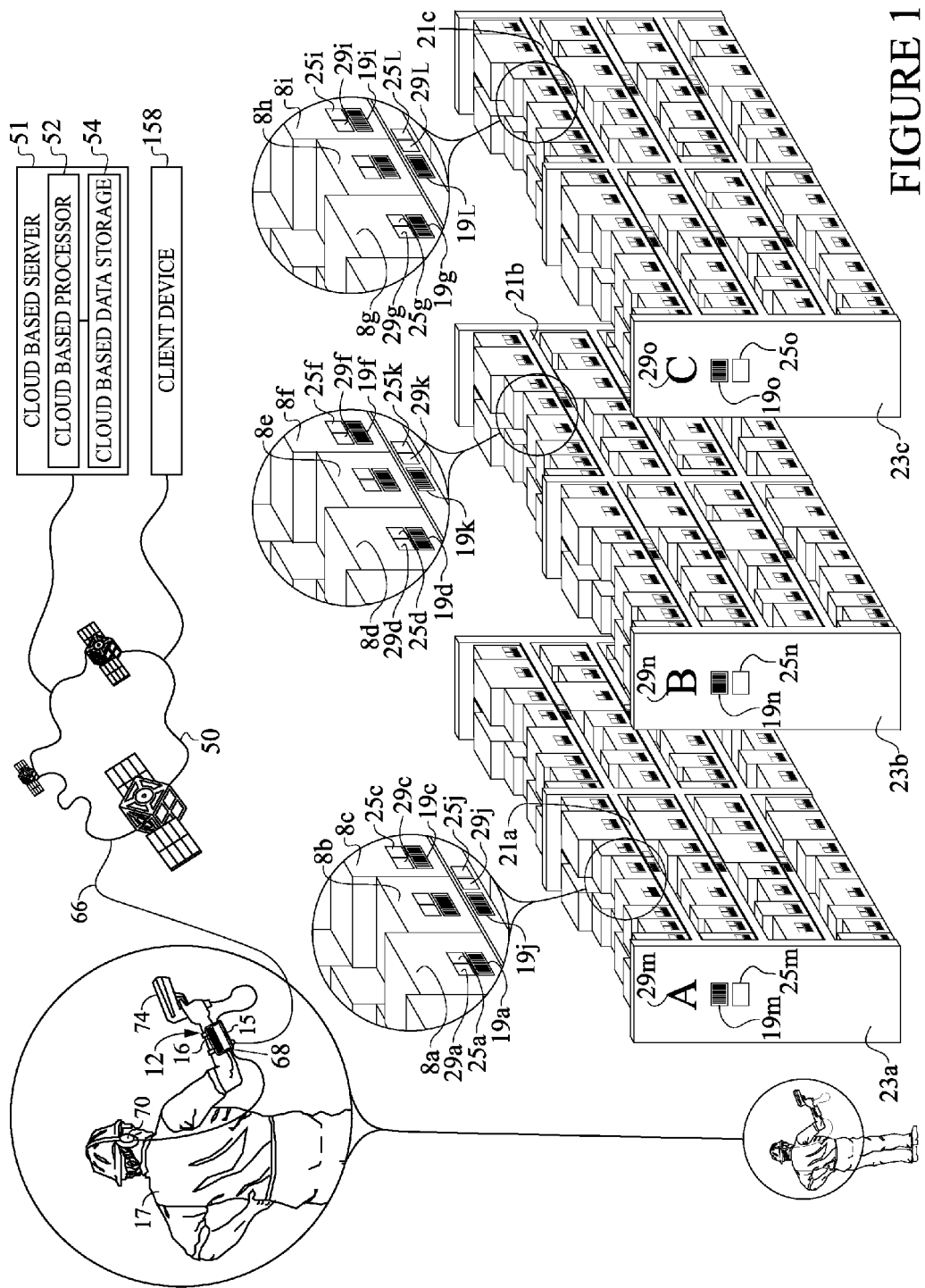
FIG. 1 shows an embodiment of a system that can be used to perform one or more embodiments of the cloud based system.

Before explaining the present cloud based computing system in detail, it is to be understood that the cloud based computing system is not limited to the particular embodiments and that it can be practiced or carried out in various ways.

The present embodiments generally relate to a cloud based computing system and associated computer implemented method for performing one or more logistics operations. The logistics operations can be object location, object identification, object picking, object picking by line, object loading onto one or more transport devices, object delivery, and combinations of these.

The method can utilize a cloud based server. The cloud based server can be in communication with a cloud based processor. The cloud based processor can be in communication with a cloud based data storage. The cloud based server can be in communication with at least one mobile processor in communication with a mobile data storage and a display.

The cloud computing system for performing a logistic operation can involve using a computing cloud that has one or more cloud based data storage units and one or more cloud based processing units.

The computing cloud can be configured to provide at least one service and shared hardware and software resources to a user.

Computer instructions can be stored in the computing cloud for transmission to the mobile processor.

The computing cloud can include computer instructions to receive, verify, and store bar codes on at least one of the objects and computer instructions to receive, verify, and store bar codes related to a location proximate to at least one of the objects.

The computing cloud can include computer instructions to receive, verify, and store RFID tag identifiers on at least one of the objects and computer instructions to receive, verify, and store an RFID tag related to the location proximate to at least one of the objects.

The computing cloud can include computer instructions to receive, verify, and store alpha codes, numeric codes, or combinations thereof on at least one of the objects and computer instructions to receive, verify, and store alpha codes, numeric codes, or combinations thereof related to the location proximate to at least one of the objects.

The computing cloud can include computer instructions to provide a first command to an operator associated with the mobile processor to identify a location of at least one objects or the object identifier.

The computing cloud can include text-to-speech computer instructions enabling the mobile computer to translate text commands to audio commands for the operator.

The computing cloud can include computer instructions that form a library of identifiable objects to be selected; a library of locations associated with each object to be selected; a library comprising operator information; a library of objects to be picked, loaded, delivered, or combinations thereof; a library of transport devices; a library of transport vehicles; and combinations thereof.

The computing cloud can include computer instructions to receive a request from the mobile processor to obtain a list of objects to be selected.

The computing cloud can include computer instructions to compile a list of objects to be selected based on a request using libraries in the computing cloud.

The computing cloud can include computer instructions to transmit the list of objects to an audio output device in communication with the mobile processor, a display in communication with the mobile processor, or combinations thereof.

In an embodiment of the computing cloud system, a mobile input device, such as a microphone, can be used in communication with the mobile processor.

In embodiments, the mobile input device can be a keyboard, a touch screen, an object identification trigger, or combinations thereof.

In an embodiment, the mobile input device can be a three dimensional spatial coordinate sensor to allow the operator to communicate object information by using a physical motion of the input device to the mobile processor.

In embodiments, the object information can include a dimension of the object, or a three dimensional spatial coordinate of the object.

In other embodiments, the object information can further include a yes answer; a no answer; a request to repeat a command; an indication that a task is a completed task; an indication that the operator has indicated the operator "cannot find the object," "cannot find the first location," "cannot find the second location," or combinations thereof; and an alpha code, a numeric code, or combinations thereof.

In embodiments, the object location identification trigger can have at least one of: a button on a wearable scanner, an optical reader, an RFID reader, or a bar code reader, a trigger on a wearable scanner, an optical reader, an RFID reader, or a bar code reader, an actuator on a wearable scanner, an optical reader, an RFID reader, a bar code reader, or combinations thereof.

In an embodiment, the computing cloud system can include computer instructions in the computing cloud to prepare a summary of objects to be selected and categorized by the location of each object and with an indication of a quantity of each object at each location.

Other embodiments of the computing cloud system can include computer instructions in the computing cloud to obtain, store, and display status information on a successful completion of selection of the objects on the list of objects to be selected that is an indication of the operator's performances compared to an expected completion time for completing selection of the objects on the list of objects to be selected.

In embodiments, the cloud computing system can further include computer instructions in the computing cloud for providing an alert to the operator that one of the objects on the list of objects to be selected is a catch weight item by using the text-to-speech computer instructions.

In other embodiments, the cloud computing system can include computer instructions in the computing cloud for recording the number and weight of the catch weight item.

The cloud computing system can include, in embodiments, a method that can include communicating instructions to an operator from the cloud based server to a mobile processor associated with an operator to instruct the operator to perform a logistics operation. The mobile processor can be configured to receive predefined responses from the operator in response to the sent instructions.

The method can include connecting to a computing cloud using a mobile processor in communication with a mobile data storage.

The method can include, in an embodiment, sending instructions from the computing cloud to the mobile processor to instruct an operator to perform a logistics operation, wherein the logistic operation comprises one or more of object location, object identification, object picking, object picking by line, object loading onto one or more transport devices, and object delivery.

In the method, the mobile processor can be configured to receive predefined responses from the operator as responses, namely, a double click signal as a response that informs the mobile processor that the operator has completed the command, that the operator has arrived at a location, that the operator is ready to accept a new command, that the operator has answered yes to a question and that the operator is ready to proceed to a next step or combinations thereof. The predefined responses from the operator of a single click signal as a response that informs the mobile processor to repeat the most recent audio command, question, information or statement. The predefined response of a hold signal from the operator can inform the mobile processor that the operator wants to perform a scan of a bar code, an RFID tag, an alpha code, a numeric code, or combinations thereof.

The predefined responses can be provided using an object location identification trigger. The object location identification trigger can be in communication with the mobile processor. The mobile processor can be configured to receive the predefined responses from the object location identification trigger.

The method can be used for selecting objects, picking by line, loading and delivering objects, such as canned food, beach chairs, or valves, by using a mobile processor with mobile data storage that communicates via a network to a cloud based server with cloud based processor and data storage.

The mobile processor with a mobile data storage can further communicate to an operator by using a display and two input devices simultaneously. One of the two input devices can be an object location identification trigger and can be very fast. The second input device can be a touch screen, keyboard, or joy stick. The mobile processor can simultaneously communicate with at least two output devices, one of which can be an audio output device and another can be a visual display.

The object location identification trigger can be a finger mounted clicker with a scanner that is wired to the mobile processor or the object location identification trigger can be a finger mounted clicker with a scanner that is in wireless communication with a mobile processor.

The object location identification trigger can be used with each mobile processor, namely, the onboard processor of the transport vehicle and the mobile processor of an operator for picking objects and loading objects. The object location identification trigger can be adapted to provide a plurality of signals, such as three simple signals, to the mobile processor. The three simple signals can be a single click, a double click, and a hold signal.

The simplicity of this process, the low cost of the operation, and the technique to increase the quantity of object or items that can be selected, picked by line, loaded or delivered can provide productivity increases from 5 percent to 25 percent for customers that pick, load, and deliver up to 6,000,000 objects or items per day.

The embodiments can save fuel costs because it can increase efficiency. The embodiments can save labor costs, such as costs associated with picking objects, picking objects by line, loading objects, and delivering objects.

The embodiments can enable the operator to pick objects accurately and faster than by using spoken word or keystrokes on a keyboard.

The mobile processor can be used to receive, verify, and store various codes on objects and can store locations, such as a certain shelf. The mobile processor can be continuously and instantaneously used in a warehouse by the operator, whereby the operator can use the object location identification trigger with a single click, a double click, and a hold signal.

The mobile processor can be used to receive, verify, and store codes for loading the objects on a particular transport device such as a numbered pallet and for delivering objects by delivery location.

The codes can indicate which transport device or transport vehicle is to be used for loading or for delivery.

The method can utilize a system, which can provide codes in a continuous and instantaneous manner to the operator, while the operator can provide a single click, a double click or a hold signal from the object location identification trigger to the mobile processor. Thus, the cloud based server can be continuously used, as opposed to a batch system.

An external computer can take, order, and create a list, or can create a delivery route for a customer. The external computer, via a network, can download the route to the cloud based server.

The cloud based server can provide a mobile processor with the list for picking the specific transport device necessary to load the items.

Once the objects are picked, picked by line, and loaded on the correct transport devices, all object and transport information, including all information on which items are picked short and what the specific catch weights are for certain items, can be communicated to an onboard mobile processor on a delivery vehicle. The cloud based computer transfers the route map to the onboard computer data storage for displaying addresses for delivery to the driver.

In an embodiment, a cloud based server with a cloud based processor and a cloud based data storage can store and continuously update various libraries in the cloud based data storage. The cloud based data storage can contain information on objects to be selected, identification of transport devices for loading, picking by line, and delivery to various locations. The updated information can include information on transport vehicles, updated street addresses, and names of customer locations for delivery of the objects.

The mobile processor can have a mobile data storage to maintain a library of information on all operators of the system, such as operator names, operator logins, and operator passwords.

The mobile data storage can have computer instructions to verify that an operator has been transmitted the correct information about objects to be selected, picked by line, loaded, delivered, or any combinations of these steps, depending on the situation.

The mobile data storage can have computer instructions to compile and transmit lists of objects, lists of delivery devices, lists of delivery vehicles, and lists of delivery locations to one or both of the mobile processors, while the operator depresses the object location identification trigger to continue to pick, pick by line, load and deliver.

The mobile processor can be wearable by an operator, which the operator can use to select objects, pick by line objects, load objects, and move loaded transport devices with objects onto transport vehicles or near a transport vehicle. The mobile processor can be in communication with the cloud based server through at least one network, such as a wireless network, a cellular network, a Bluetooth communications network, or another network.

The mobile processor with object location identification trigger can communicate on a separate network with the cloud based server and an onboard computer. The onboard computer can have an onboard computer processor with an onboard data storage.

The mobile processor can be in communication with its own mobile data storage, a display, and a first output that can connect to an output device, such as headphones to be worn by an operator. The mobile processor can be in communication with a second output that can connect to the display.

The mobile processor can have at least two inputs for receiving information from the object location identification trigger and from another source, such as a keyboard or touch screen. The inputs can be used simultaneously for fast operation.

The mobile processor can also be in communication with additional input devices, such as a wearable scanner, an optical reader, an RFID tag indicator reader, or a bar code reader.

In one or more embodiments, the input device can be a touch screen, a joy stick, or a Braille command input device, or combinations thereof.

The input device can be a three dimensional spatial coordinate sensor that allows the operator to communicate object information, such as alpha codes, numeric codes or combinations thereof to the mobile processor and onto the cloud based server.

The input device can allow the operator to make multiple requests for information, such as: lists of objects to be selected in the warehouse, or other facility with lists of objects for loading, which can be "oil field drill bits size 12"; lists of picked by line objects to be picked, which can be a case of "Beefsteak Tomatoes"; lists of objects to be loaded on a specific transport device, such as "all the #2 box filters go on the cart numbered 1234"; and lists of objects to be loaded on specific transport vehicles, such as "all objects on the transport device cart 1235 go on the brown truck 34 in bay 12."

In an embodiment, one of the input devices can be used with the method to communicate acknowledgement of a list through a physical motion of the operator with the input device, such as the sweep of the arm.

The physical motion of the input device can also be used to initiate a communication from the input device to the mobile processor.

The mobile data storage can have computer instructions to receive, verify, and store various codes on objects. For example, canned corn can have a code on it for a 12 pack and a different code on it for a 24 pack.

The codes on objects can include: a bar code, an RFID tag, an alpha code, a numeric code, an alpha-numeric code, or combinations thereof.

The mobile data storage can have computer instructions to receive, verify, and store various bar codes to identify a first location proximate to one or more of the objects. The first location can be a location such as Shelf 2 of Aisle 10 in the Green warehouse.

The first location can have a bar code, an RFID tag, an alpha code, a numeric code, an alpha-numeric codes, or combinations thereof.

The mobile data storage can have computer instructions to receive, verify, and store codes related to a second location that can be proximate to the first location, such as an aisle location proximate to a shelf location. The second location can be the end of aisle 10, wherein the 12 pack of canned corn is located on shelf 2.

The second location proximate to the first location can have a bar code, an RFID tag, an alpha code, a numeric code, an alpha-numeric code, or combinations thereof.

The mobile data storage can include computer instructions to receive, verify, and store codes on at least one transport device, such as a cart numbered 456, or a pallet with an RFID tag.

The transport device can be a bar code, an RFID tag, an alpha code, a numeric code, an alpha-numeric code, or combinations thereof.

The mobile data storage can include computer instructions to receive, verify, and store codes on a location of a transport vehicle, such as Bay 12.

The location of the transport vehicle can be can be a bar code, an RFID tag, an alpha code, a numeric code, an alpha-numeric code, or combinations thereof.

The mobile data storage can include computer instructions to receive, verify, and store codes on a transport vehicle, such as Truck 24.

The transport vehicle can be can be a bar code, an RFID tag, an alpha code, a numeric code, an alpha-numeric code, or combinations thereof.

An operator can drive the transport vehicle, while an onboard mobile processor with transport vehicle display, two different transport vehicle input devices, and at least two transport vehicle outputs with at least one transport vehicle output device can be used.

The onboard mobile processor can communicate with an onboard mobile data storage to receive a list of objects to be delivered from the cloud based server.

The onboard mobile processor can use an object location identification trigger, while on the transport vehicle, to acknowledge the continuous feed of information. In this way, the operator can be continuously redirected and rerouted when necessary or due to changed conditions. For example, the driver can change a delivery schedule while driving based on a new customer need, such as a delivery of meat for a wedding dinner with a delivery time scheduled for 4:00 pm that must now occur at 12:00 pm.

Changes in a route can be made due to changed road conditions or for efficiency, such as rerouting the driver from one interstate to another interstate. The transport vehicle mobile processor data storage and onboard processor can communicate with the cloud based server and with a built in or on-board global positioning device to enable the cloud based server to track the exact location of each truck and re-route. This allows a driver to acknowledge a change with the object location identification trigger, rather than having to stop the truck and type in a change.

Text messaging is no longer necessary, which is important to drivers as the text messaging laws have changed. This embodiment allows an operator to provide acknowledgement to changes while driving without sending a text message.

The mobile data storage of either processor can include computer instructions to provide a first command to an operator identifying one or more objects to select, one or more first locations to visit for the objects, identifying one or more second locations proximate to the first locations, identifying one or more transport devices for loading one or more objects, identifying one or more locations of the transport vehicles, or identifying one or more vehicles to load transport devices or objects onto.

For example, a first command can be text viewable on the display that reads "12 canned corn 24 packs number A34." Another example of the first command can read "Aisle 12." Another command can be "Load 3 canned corn 24 packs on cart 3"; "Load 2 canned corn 24 packs on cart 1" or "Load 7 canned corn 24 packs on pallet AB." Another command can be "take all objects on transport device to loading bay 6." Another command can be "load transport device 3 and transport device 6 on truck 3 in loading bay 6." Additional commands can be "load transport device 3 on truck 3 in loading bay 6" and "leaving transport device 1 at loading bay 2."

The above are just a few examples of the commands that can be used in the cloud computing system.

Alternatively, the commands can be expressed as numbers, for example, the screen can display:

BC-119-11 BC-120-00

1 B-2 2 A-3

The first indicator "BC" can be an aisle number.

The "119-11" can be a slot number for the goods.

The "1" under the "BC" can be a quantity of goods.

The "B-2" can be a pallet number B in quadrant 2 of the pallet.

Additional information can be expressed on the screen, such as the type of goods, such as "margarine solids pure vegetable."

An order number can be on the screen, such as 23456.

The route number and the customer name can be displayed on the screen.

The mobile data storage can include computer instructions to provide a second command to the operator indicating the operator should now move to the second location from the first location. This command can be repeated as needed by the warehouse or operator.

An example of this command can be:
Command 1—Go to aisle 3 with cart 3.
Command 2—Go to shelf 2 pick 6 green pea 3 packs.
Command 3—Go to aisle 1 with cart 3.
Command 4—Pick 4 60 can units of SPAM™.
Command 5—Leave loaded cart 3 at Bay 10 for truck 2.

The command can be presented visually on the display, such as with text, a flashing indicator, or anther visual command.

The commands can be presented as an audio command, such as a verbal text message transmitted through an audio output, or as a sequence of beeps, such as 3 beeps means aisle 3, or another audio command. For example, beeps can acknowledge that the scanning occurred properly with 1 beep or improperly with 3 beeps.

The mobile data storage can include text-to-speech computer instructions to enable the mobile processor to translate a text command to audio commands for the operator. This feature enables the commands to be presented simultaneously as both text and audio, to reduce mistakes, and quicken the picking of the objects, thereby reducing expensive delays in the picking process.

For example, a command provided by the mobile data storage on the display instructing the operator to "Go to Aisle 12, Shelf 4 to select Box 1" can be translated by the mobile processor into an audio command in a language other than English, for example in Spanish and simultaneously provided to the audio output of the operator. This increases the versatility of the system.

The mobile data storage can include computer instructions for receiving queries from the operator. For example, the operator can ask the mobile processors to repeat the last audio command by using the input device or initiating a single click on the object location identification trigger, which is very fast compared to other methods.

The computer instructions in the mobile data storage can enable the mobile processors to receive queries from the operator, to respond to the query, and to pass the query onto the cloud based computer via the network if more information is needed.

Both of the mobile data storages can include computer instructions to request the cloud based server to verify that the mobile data storage has a current version of at least one library needed to do the picking, the loading and/or the delivery of the objects.

The mobile data storage and the transport vehicle mobile data storage can include computer instructions for receiving updated versions of the libraries from the cloud based server, such as by downloading the updated versions of the libraries. The method and system can ensure that the libraries in the mobile data storage are up-to-date at all times.

The libraries can be loaded in the mobile data storages of the system from the cloud based server. The libraries can include a library of identifiable objects to be selected; a library of each first location associated with each object to be selected; a library of each second location associated with each first location; a library of authorized operators of the mobile processor s, a library of operator information on the operators; a library of pick by line objects, a library of objects to be loaded; a library of transport devices; a library of transport vehicles; a library with mapping software, a library of customers for delivery, or combinations thereof.

Each library can include a listing of all associated elements within that library and information related to the associated elements. For example, in the library of transport devices, the library can include a listing of all transport devices, carts, mini-trucks, skids, pallets and so on.

The library of transport devices can also include information related to each transport device, such as each bar code, each RFID tag, each alpha code, or each numeric code disposed on each transport device.

The library can also include information on how much weight the transport device can carry, when the device was last serviced or last inspected for safety, and who used the transport device last.

Other specification information on the transport device can be included in the library, such as volume capacity of the transport device, how long the battery lasts, how many wheels the transport device has, and other detailed specification information.

The cloud based data storage can include computer instructions to receive requests from the mobile processor for a list of objects to be selected, for a list of pick by line objects, for a list of objects to be loaded, for a list of transport devices to be loaded, for a list of transport vehicles to be loaded and for a list of objects to be delivered at various delivery locations.

The cloud based data storage can include computer instructions to compile the various lists using the libraries in the cloud based data storage and using a customized task list for picking, picking by line, loading and delivery based on customer orders.

Furthermore, the cloud based data storage can include computer instructions to transmit the list of objects to be selected, the list of pick by line objects, the list of objects to be loaded, the list of transport devices to be loaded, the list of transport vehicles to be loaded and the list of delivery locations from the cloud based data storage to the mobile data storage or the onboard mobile data storage.

The mobile data storage and the onboard mobile data storage can include computer instructions for providing results from use of the object location identification trigger, the input device or both to the cloud based server via the network.

The object location identification trigger can connect to an input on the mobile processor and another input device, like a backup keyboard that can be used to connect to a second input on the mobile processor.

A second output can connect the display with the mobile processor for viewing by the operator with the mobile processor.

The audio output device and the display can provide commands to the operator, such as "Go to 123 Main Street, Houston, Tex."

The display, the audio output device, or both can present one or more of the aforementioned lists to the operator as well as the commands.

The object location identification trigger can be integral with the mobile processor formed in the housing, or it can be a separate device that connects to the mobile processor, either wirelessly or with a cable.

The object location identification trigger can have a trigger or button that the operator can click, double click, or hold to create a signal that transfers to the mobile processor, which can then be uploaded to the cloud based server.

The object location identification trigger can be any one of the following: a wearable scanner with a button, an optical reader with a button, an RFID reader with a button allowing double clicks, single clicks or holds, or a bar code reader with a button.

In another embodiment, the object location identification trigger can look like a gun, and can have a trigger mechanism like a gun that can have a scanner, an optical reader, an RFID reader, or a bar code reader on the gun barrel portion.

Examples of object location identification triggers can be the scanner triggers or buttons on the wearable ring scanner RS409 and back-of-the-hand scanner RS309 made by Motorola Solutions of Schaumberg, Ill.

The operator can use the object location identification trigger to communicate to the mobile processor that the operator has completed a command, by quickly depressing or pulling the trigger as a single click, a double click or a hold.

No English or standardized language is needed with this process for high efficiency picking, picking by line, loading and delivery.

The assembly can eliminate speech recognition errors often associated with spoken input or spoken responses that might occur without such a trigger device.

A double click signal can be used to indicate an operator is ready for the next command. For example, the operator can actuate or click the object location identification trigger twice to initiate the transmission of a signal to the mobile processor, thereby providing the communication that the operator is ready for the next step.

The operator can use the double click signal to answer yes to a question presented by the mobile processor, such as "Are the brakes working correctly?" The operator can double click to indicate a yes answer.

The operator can use the object location identification trigger to send a request to the mobile processor to repeat the most recent command, question, information or statement by providing a single click signal.

The operator can use the object location identification trigger to provide a hold signal that informs the mobile processor that the operator is ready to perform the following: scan or read a bar code, an RFID tag, an alpha code, a numeric code, or combinations thereof on at least one of the objects, at a first location, at a second location, at a transport device, at a location proximate to a transport vehicle, or on a transport vehicle.

One or more embodiments of the method and system can include communicating from the cloud based server, the mobile processor, the onboard mobile processor, or combinations thereof, to an external computer system or to a client device. The external computer system or client device can be a client laptop that uses the network.

The external computer can have a data storage to take orders from customers, store orders, track inventory and create bills for customers. The external computer can be connected via the Internet to the cloud based server.

The object information, requests, or other communications transmitted by using an input device can include using an input device that recognizes a dimension of the object, such as a three dimensional spatial coordinates.

Another embodiment can include using an input device to recognize a physical movement, such as waiving an arm as a yes answer or a no answer. The input device can recognize a request to repeat a command, an indication that a task commanded is now complete, or an indication that the operator: "cannot find the object," "cannot find the first location," "cannot find the second location," "cannot find the transport device," "cannot find the transport vehicle," "cannot find the location near the transport vehicle," "cannot find the delivery location," or combinations thereof.

In one or more embodiments, the mobile data storage can include computer instructions to transmit an operator code such as a log in number entered by the operator into the mobile processor to the cloud based processor.

The system can have the ability to verify each operator. This can prevent unwanted access to the system by individuals who are not trained on how to use the system.

The cloud based data storage can include computer instructions to acknowledge the operator code and to verify that the operator associated with the operator code can have access to the mobile processor and the libraries.

The mobile data storage can include computer instructions for instructing the mobile processor to prepare a summary of objects to be selected. The summary of objects to be selected can be categorized according to the first location and second location of each object, transport device, transport vehicle, and delivery location.

The summary of objects can include an indication of a quantity of each object to be selected at each location. The summary of objects can be prepared using the lists of objects and the libraries.

The mobile data storage can include computer instructions to obtain, store, and display status information on a successful completion of the tasks relative to the objects on the lists.

These computer instructions can be used to continuously and instantaneously provide an indication of the operator's performance compared to an expected completion time. The expected completion time can be an expected completion time for completing selection of the objects on the list of objects to be selected or completing another one of the many tasks on one or more of the lists.

The mobile data storage can include computer instructions for receiving information from the input device or the object location identification trigger that the operator has picked short. The mobile data storage can then transmit a command to the audio output device, display, or combinations thereof for the operator to receive for action.

An example of when the operator has picked short can include a circumstance where the operator has provided an indication or communication to the mobile processor by using the input device that a quantity of selected objects by the operator is less than a quantity of objects indicated on the list of objects to be selected.

The mobile data storage can include computer instructions to allow the operator to use the input device to enter and store a reason the operator has picked short, a reason the quantity of selected objects is less than the quantity of objects indicated on the list of objects to be selected, or combinations thereof.

The mobile data storage can include computer instructions to allow the operator to use the input device to enter and store a reason the operator picked short, a reason the quantity of selected objects is less than the quantity of objects indicated on the list of objects to be selected, or combinations thereof.

The mobile data storage can include computer instructions for providing an alert to the operator that one of the objects on the list of objects to be selected is a catch weight item.

The alert can be an audio or visual alert that can be communicated to the operator by using the display and/or the audio output. The alert can be provided by using the text-to-speech computer instructions, wherein the audio is in one language and the text can be in a different language.

The term "catch weight item" is defined herein to mean the total number of pounds on cases that change weight, such as 5 turkeys weighing 50.1 pounds can be a catch weight for the turkeys.

The mobile data storage can include computer instructions for recording the number and weight of catch weight items. The operator can use the input device to record the number and weight of catch weight items.

The mobile data storage can include computer instructions to provide a high quantity item alert to the operator by using the output device after the summary of objects to be selected is provided to the operator.

The high quantity item alert can be an audio or visual alert that can be provided using the audio output or the display, and can be provided when a large quantity of a particular item is required to be selected, picked by line, loaded, or delivered.

An example of the use of a high quantity alert would be where the quantity of items or objects to be selected is large enough so that it is easier to pull a full pallet or case, and then unload or take off a few of the items or objects until the quantity of items or objects remaining on the pallet or in the case equals the quantity to be picked rather than creating a new pallet by picking or transferring a high quantity of the objects or items to the new pallet. This saves time and work.

One or more embodiments of the method and system can include using at least one transport device. Each object to be selected can be disposed on or contained by a transport device. A transport device can include a cooler, a pallet, a tote, a box, a sack, a bag, a wheeled trolley, a container, or combinations thereof.

One or more embodiments can include using a transport vehicle to carry the transport devices, such as from a warehouse to a delivery location. These transport devices can have an on-board GPS that communicates directly to the cloud based server or to the onboard mobile processor.

The mobile data storage can include computer instructions to instruct the mobile processor to provide a request to the operator to answer a series of safety questions regarding any transport device or transport vehicle to be used for loading or delivery.

The request to answer safety questions can be provided to the operator by using the display or the audio output or simultaneously using both.

The safety questions can include: "Are brakes on the transport vehicle working?"; "Is a horn on the transport vehicle working?"; "Is steering on the transport vehicle working?"; "Is the transport vehicle free of damage?"; "Is the transport vehicle free of leaks?"; "Are tires on the transport vehicle inflated and undamaged?"; and "Are forks on the transport vehicle undamaged?"

The mobile data storage can include computer instructions for instructing the mobile processor to alert the operator to position each object at a specific location on an identified transport device or transport vehicle. The alert can be provided to the operator using the display or the audio output. For example, the specific location on the transport device can be at a bottom of a left quadrant of a pallet. For example, the specific location on the transport vehicle can be at a rear left portion of trailer of truck 12 in Bay 11.

The cloud based data storage can include computer instructions to indicate to the mobile processor at least one location for delivery of objects selected from the list of objects to be selected. The at least one location for delivery can be a loading location, a staging location, an interim location, a back of a truck, a trailer, or a vessel.

The cloud based data storage can include computer instructions to create a route associated with each object disposed on a transport vehicle. The route can be created using GPS or other mapping software that can be stored in the cloud based data storage. The cloud based server can transmit the route to the mobile processor, the transport onboard processor, the mobile data storage, or the onboard mobile data storage through the network.

The onboard mobile data storage can include computer instructions to receive the route from the cloud based server.

One or more embodiments can include a client device, such as a laptop, a portable digital assistant (PDA), a smart phone, a cellular phone, or another device. The client device can be in communication with the mobile processor, the cloud based processor, the transport onboard processor, or combinations thereof through the network.

Turning now to the Figures, FIG. 1 shows a system for selecting objects 8a-8i.

A bar code 19a can be associated with the object 8a, a bar code 19c can be associated with the object 8c, a bar code 19d can be associated with the object 8d, a bar code 19f can be associated with the object 8f, a bar code 19g can be associated with the object 8g, and a bar code 19i can be associated with the object 8i.

An RFID tag 25a and an alpha/numeric code 29a can be associated with the object 8a, an RFID tag 25c and an alpha/numeric code 29c can be associated with the object 8c, an RFID tag 25d and an alpha/numeric code 29d can be associated with the object 8d, an RFID tag 25f and an alpha/numeric code 29f can be associated with the object 8f, an RFID tag 25g and an alpha/numeric code 29g can be associated with the object 8g, and an RFID tag 25i and an alpha/numeric code 29i can be associated with the object 8i.

A bar code 19j, an RFID tag 25j and an alpha/numeric code 29j can be associated with a first location 21a, here shown as a shelf. A bar code 19k, an RFID tag 25k and an alpha/numeric code 29k can be associated with a first location 21b. A bar code 19L, an RFID tag 25L and an alpha/numeric code 29L can be associated with a first location 21c.

A bar code 19m, an RFID tag 25m, and an alpha/numeric code 29m can be associated with a second location 23a, here shown as an aisle. A bar code 19n, an RFID tag 25n, and an alpha/numeric code 29n can be associated with the second location 23b. A bar code 19o, an RFID tag 25o, and an alpha/numeric code 29o can be associated with the second location 23c.

A cloud based server 51 can have a cloud based processor 52 and a cloud based data storage 54. The cloud based server 51 can be in communication with a network 50.

An operator 17 can have a mobile processor 12 which can be in communication with a display 15, an input 16, and an audio output device 70 which can be in communication with an output 68.

The operator 17 can have an object location identification trigger 74 which can be in communication with the mobile processor 12.

A client device 158 can be in communication with the network 50. Status information 66 can be communicated over the network 50.

FIGS. 2A-2F depict an embodiment of the mobile data storage 14.

The mobile data storage 14 can include: computer instructions to receive, verify, and store bar codes on at least one of the objects 18; computer instructions to receive, verify, and store bar codes related to a first location proximate to at least one of the objects 20; computer instructions to receive, verify, and store bar codes related to a second location proximate to the first location 22; computer instructions to receive, verify, and store RFID tag identifiers on at least one of the objects 24;

and computer instructions to receive, verify, and store an RFID tag related to the first location proximate to at least one of the objects 26.

The mobile data storage 14 can also include: computer instructions to receive, verify, and store an RFID tag related to the second location proximate to the first location 28; computer instructions to receive, verify, and store alpha codes, numeric codes, or combinations thereof on at least one of the objects 30; computer instructions to receive, verify, and store alpha codes, numeric codes, or combinations thereof related to the first location proximate to at least one of the objects 32; computer instructions to receive, verify, and store alpha codes, numeric codes or combinations thereof on the second location proximate to the first location 34; and computer instructions to provide a first command to an operator identifying at least one of the objects, the first location of at least one of the objects, the second location relative to the first location, or combination thereof 36.

Figure 2A:
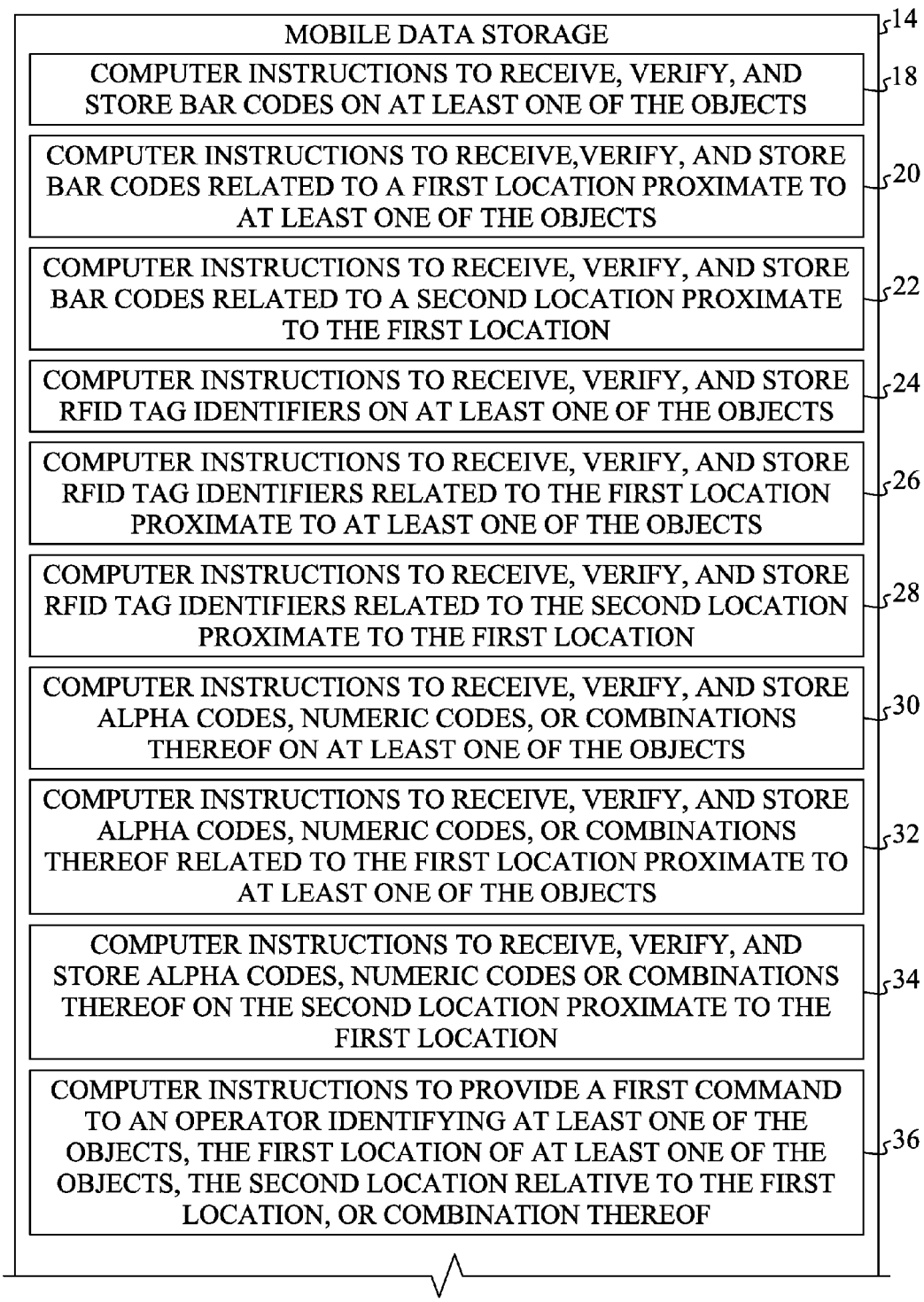
FIGS. 2A-2F show computer instructions in the mobile data storage that can be used to perform one or more embodiments of the cloud based system.
Figure 2B:
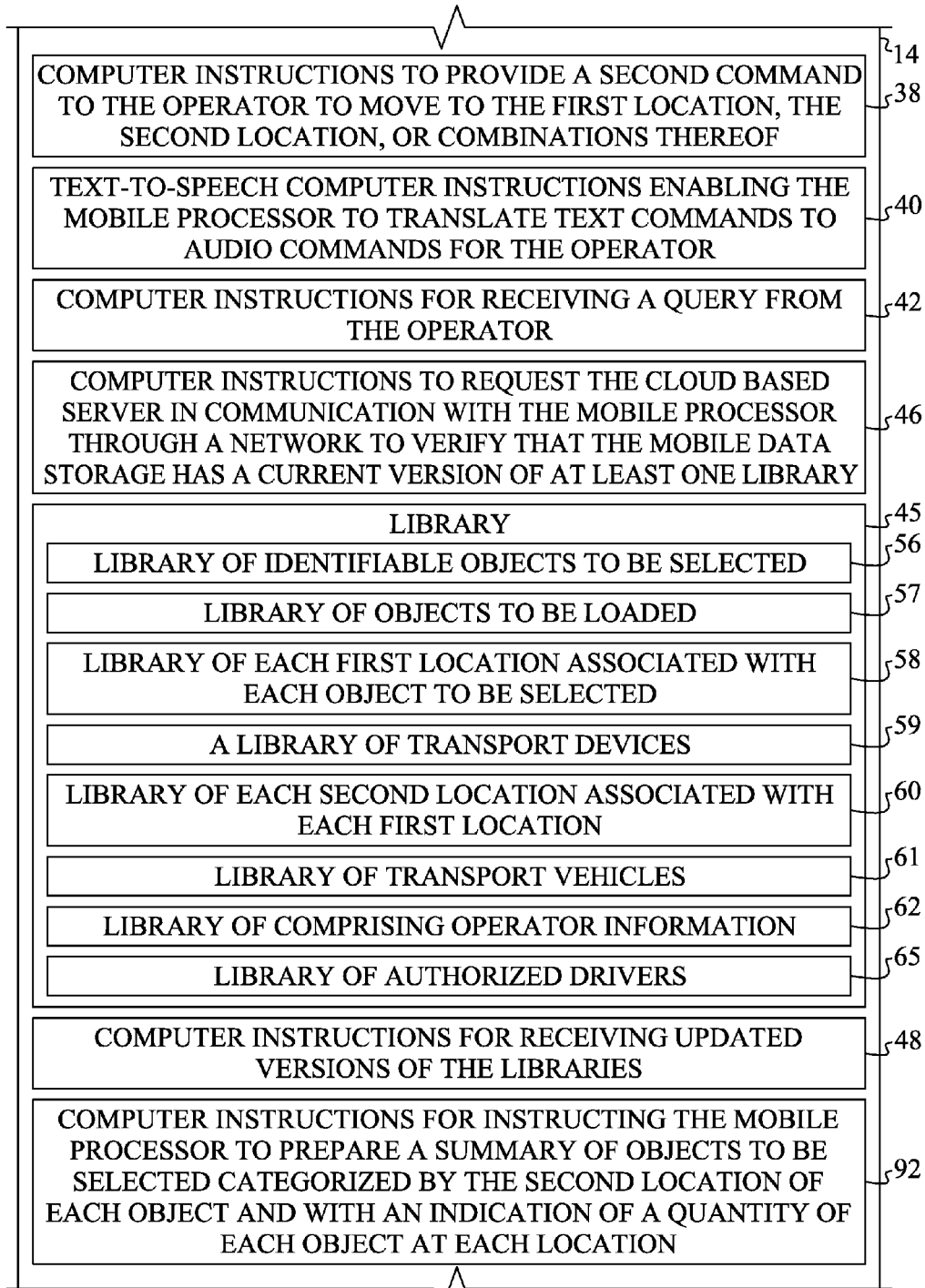

FIG. 2B is a continuation of FIG. 2A.

The mobile data storage 14 can include: computer instructions to provide a second command to the operator to move to the first location, the second location, or combinations thereof 38; text-to-speech computer instructions enabling the mobile processor to translate text commands to audio commands for the operator 40; computer instructions for receiving a query from the operator 42; and computer instructions to request the cloud based server in communication with the mobile processor through a network to verify that the mobile data storage has a current version of at least one library 46.

The mobile data storage 14 can include the library 45 which can include: the library of identifiable objects to be selected 56; the library of each first location associated with each object to be selected 58; the library of each second location associated with each first location 60; the library of comprising operator information 62, which can be a list of operators who are authorized to use the cloud based data storage.

The library 45 can also include the library of objects to be loaded 57; the library of transport devices 59; the library of authorized drivers 65; and the library of transport vehicles 61.

The mobile data storage 14 can include computer instructions for receiving updated versions of the libraries 48, and computer instructions for instructing the mobile processor to prepare a summary of objects to be selected and categorized by the second location of each object and with an indication of a quantity of each object at each location 92.

Figure 2C:
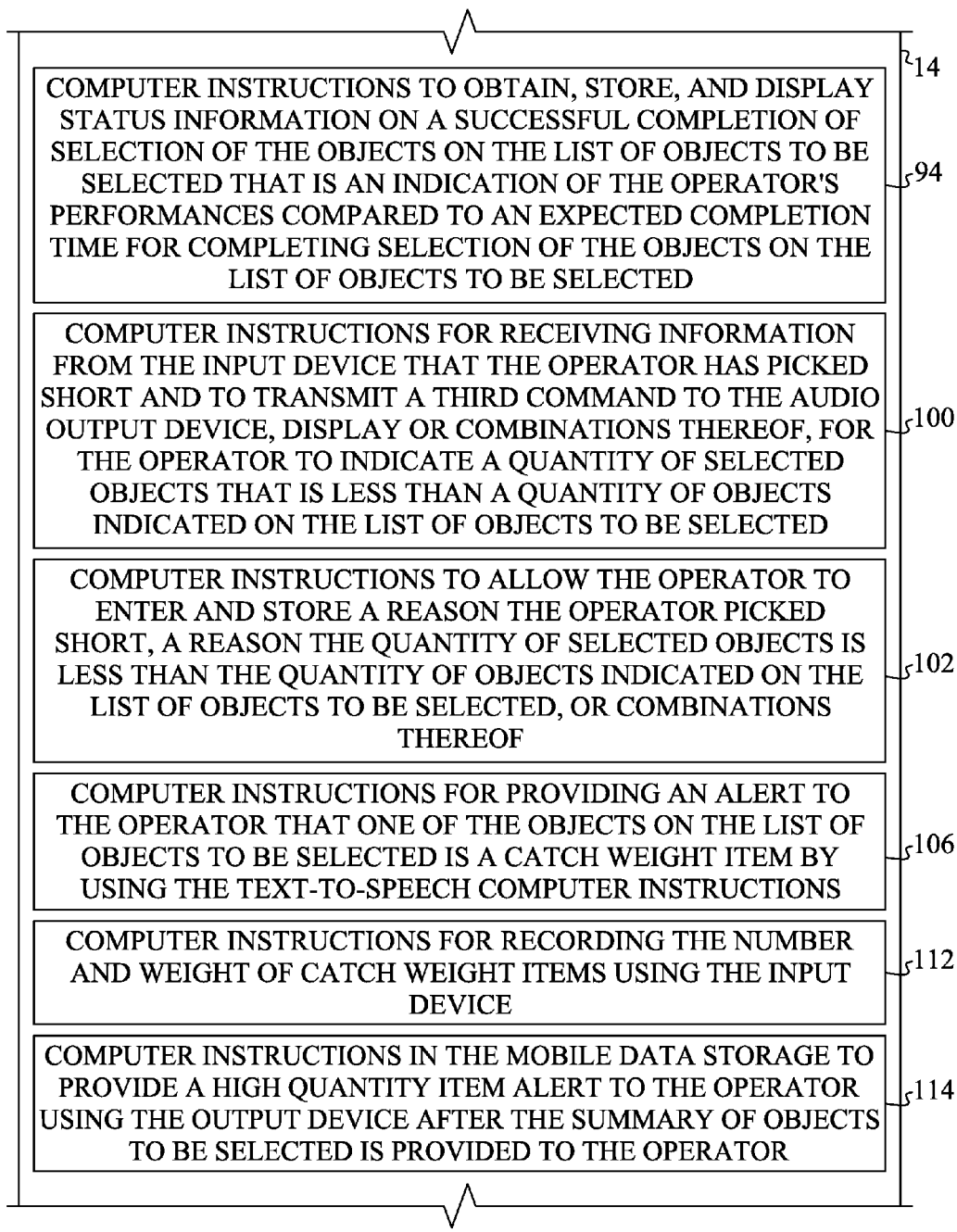

FIG. 2C is a continuation of FIG. 2B.

The mobile data storage 14 can include: computer instructions to obtain, store, and display status information on a successful completion of selection of the objects on the list of objects to be selected that is an indication of the operator's performances compared to an expected completion time for completing selection of the objects on the list of objects to be selected 94, and computer instructions for receiving information from the input device that the operator has picked short and to transmit a third command to the audio output device, display or combinations thereof, for the operator to indicate a quantity of selected objects that is less than a quantity of objects indicated on the list of objects to be selected 100.

The mobile data storage 14 can include: computer instructions to allow the operator to enter and store a reason the operator picked short, a reason the quantity of selected objects is less than the quantity of objects indicated on the list of objects to be selected, or combinations thereof 102; computer instructions for providing an alert to the operator that one of the objects on the list of objects to be selected is a catch weight item by using the text-to-speech computer instructions 106; computer instructions for recording the number and weight of catch weight items using the input device 112; and computer instructions to provide a high quantity item alert to the operator using the output device after the summary of objects to be selected is provided to the operator 114.

Figure 2D:
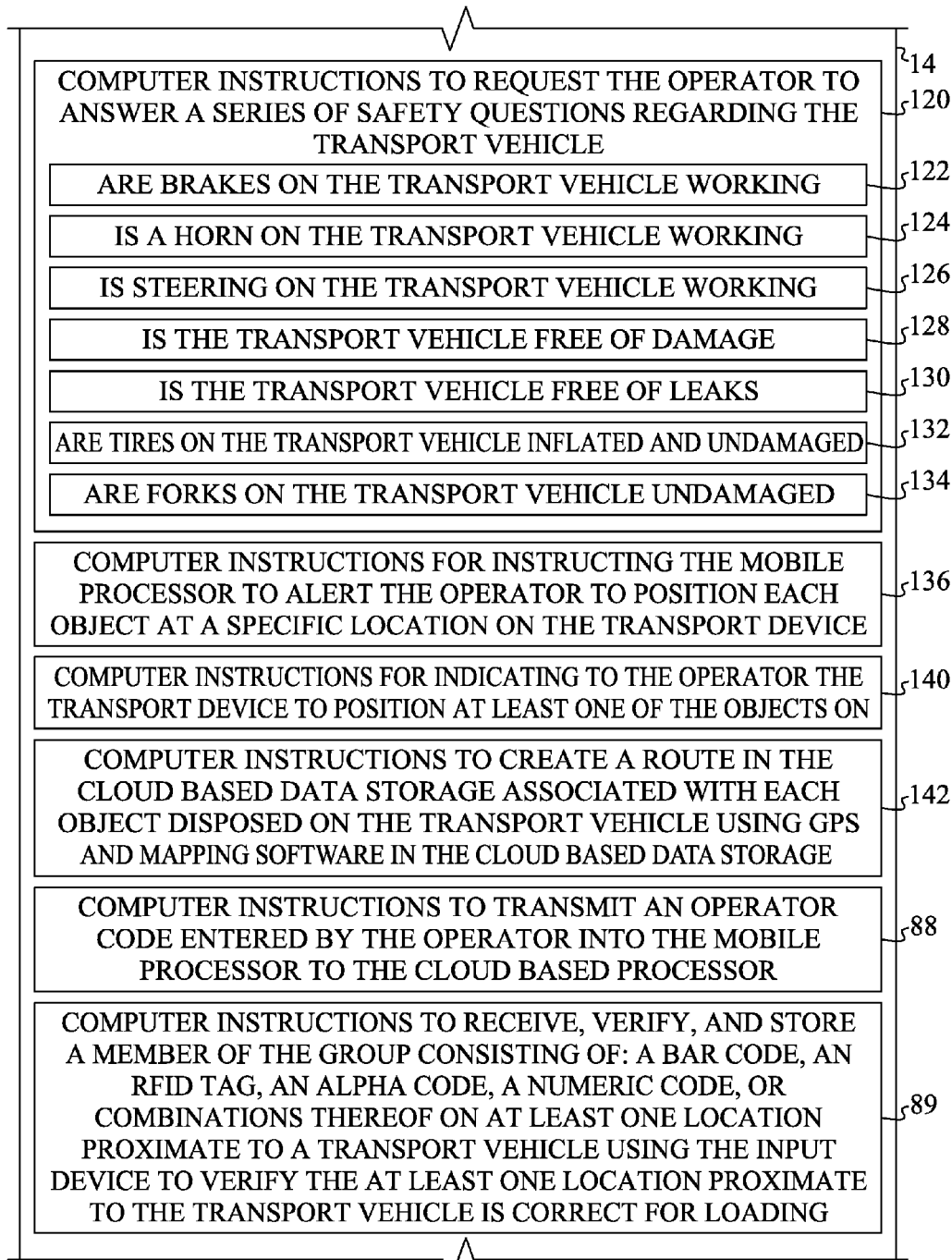

FIG. 2D is a continuation of FIG. 2C.

The mobile data storage 14 can include: computer instructions to request the operator to answer a series of safety questions regarding the transport vehicle 120; computer instructions for instructing the mobile processor to alert the operator to position each object at a specific location on the transport device 136; computer instructions for indicating to the operator the transport device to position at least one of the objects on 140; and computer instructions to create a route in the cloud based data storage associated with each object disposed on the transport vehicle using GPS and mapping software in the cloud based data storage 142.

The computer instructions to request the operator to answer a series of safety questions regarding the transport vehicle 120 can include the following questions: are brakes on the transport vehicle working? 122; is a horn on the transport vehicle working? 124; is steering on the transport vehicle working? 126; is the transport vehicle free of damage? 128; is the transport vehicle free of leaks? 130; are tires on the transport vehicle inflated and undamaged? 132; and are forks on the transport vehicle undamaged? 134.

When the questions are designed to normally be answered yes, the operator with this system can reply yes by clicking twice with the object location identification trigger.

Also shown in the mobile data storage 14 are computer instructions to transmit an operator code entered by the operator into the mobile processor to the cloud based processor 88.

The mobile data storage 14 can have computer instructions to receive, verify, and store a member of the group consisting of: a bar code, an RFID tag, an alpha code, a numeric code, or combinations thereof on at least one location proximate to a transport vehicle using the input device to verify the at least one location proximate to the transport vehicle is correct for loading 89.

Figure 2E:
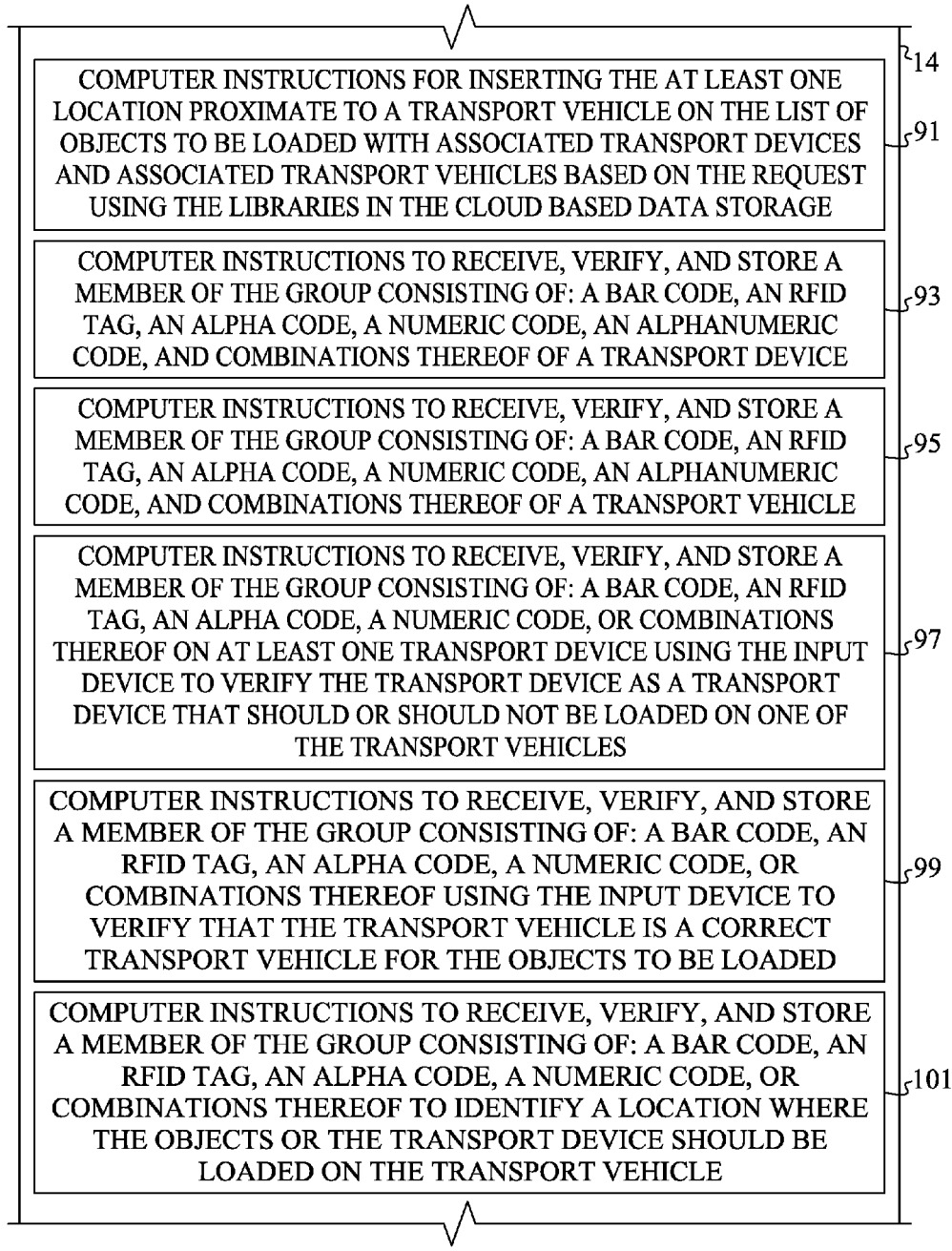

FIG. 2E is a continuation of FIG. 2D.

The mobile data storage 14 can include computer instructions for inserting the at least one location proximate to a transport vehicle on the list of objects to be loaded with associated transport devices and associated transport vehicles based on the request using the libraries in the cloud based data storage 91.

The mobile data storage 14 can include: computer instructions to receive, verify, and store a member of the group consisting of: a bar code, an RFID tag, an alpha code, a numeric code, an alphanumeric code, and combinations thereof of a transport device 93; computer instructions to receive, verify, and store a member of the group consisting of: a bar code, an RFID tag, an alpha code, a numeric code, an alphanumeric code, and combinations thereof of a transport vehicle 95; computer instructions to receive, verify, and store a member of the group consisting of: a bar code, an RFID tag, an alpha code, a numeric code, or combinations thereof on at least one transport device using the input device to verify the transport device as a transport device that should or should not be loaded on one of the transport vehicles 97; computer instructions to receive, verify, and store a member of the group consisting of: a bar code, an RFID tag, an alpha code, a numeric code, or combinations thereof using the input device to verify that the transport vehicle is a correct transport vehicle for the objects to be loaded 99; and computer instructions to receive, verify, and store a member of the group consisting of: a bar code, an RFID tag, an alpha code, a numeric code, or combinations thereof to identify a location where the objects or the transport device should be loaded on the transport vehicle 101.

Figure 2F:
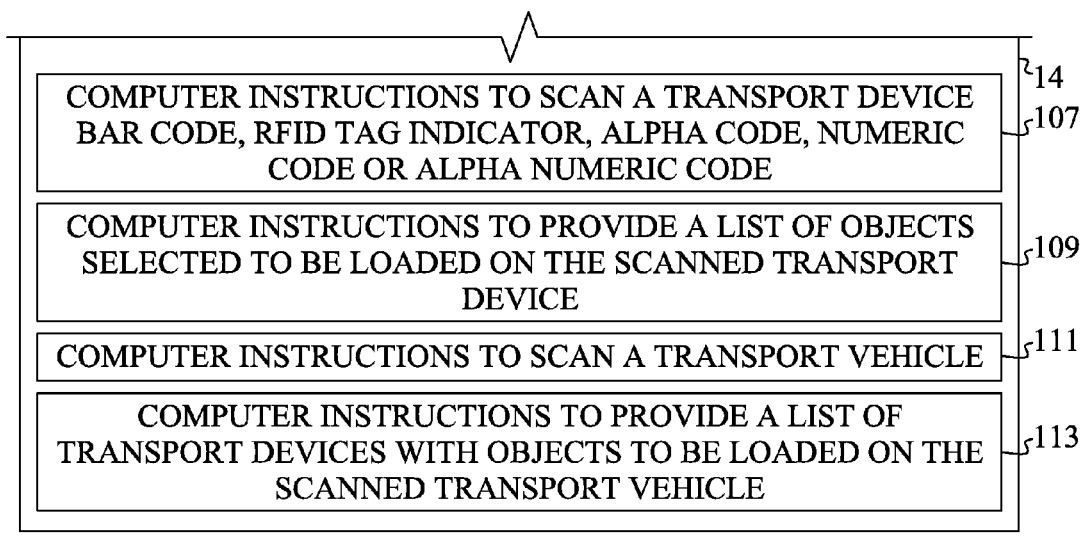

FIG. 2F is a continuation of FIG. 2E.

The mobile data storage 14 can include: computer instructions to scan a transport device bar code, RFID tag indicator, alpha code, numeric code or alpha/numeric code 107; computer instructions to provide a list of objects selected to be loaded on the scanned transport device 109; computer instructions to scan a transport vehicle 111; and computer instructions to provide a list of transport devices with objects to be loaded on the scanned transport vehicle 113.

Figure 3A:
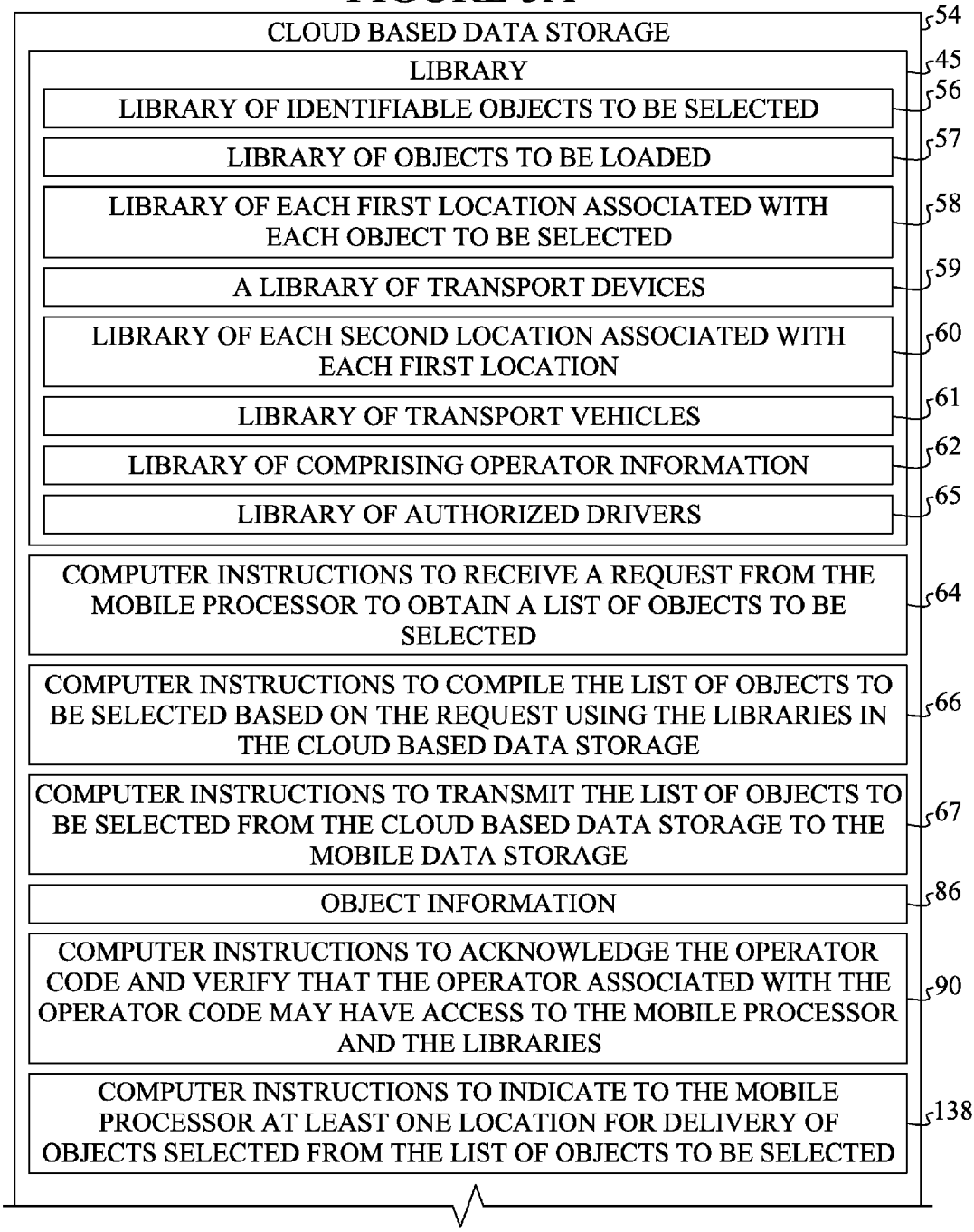
FIGS. 3A-3B show an embodiment of the cloud based data storage with computer instructions that can be used to perform one or more embodiments.
Figure 3B:
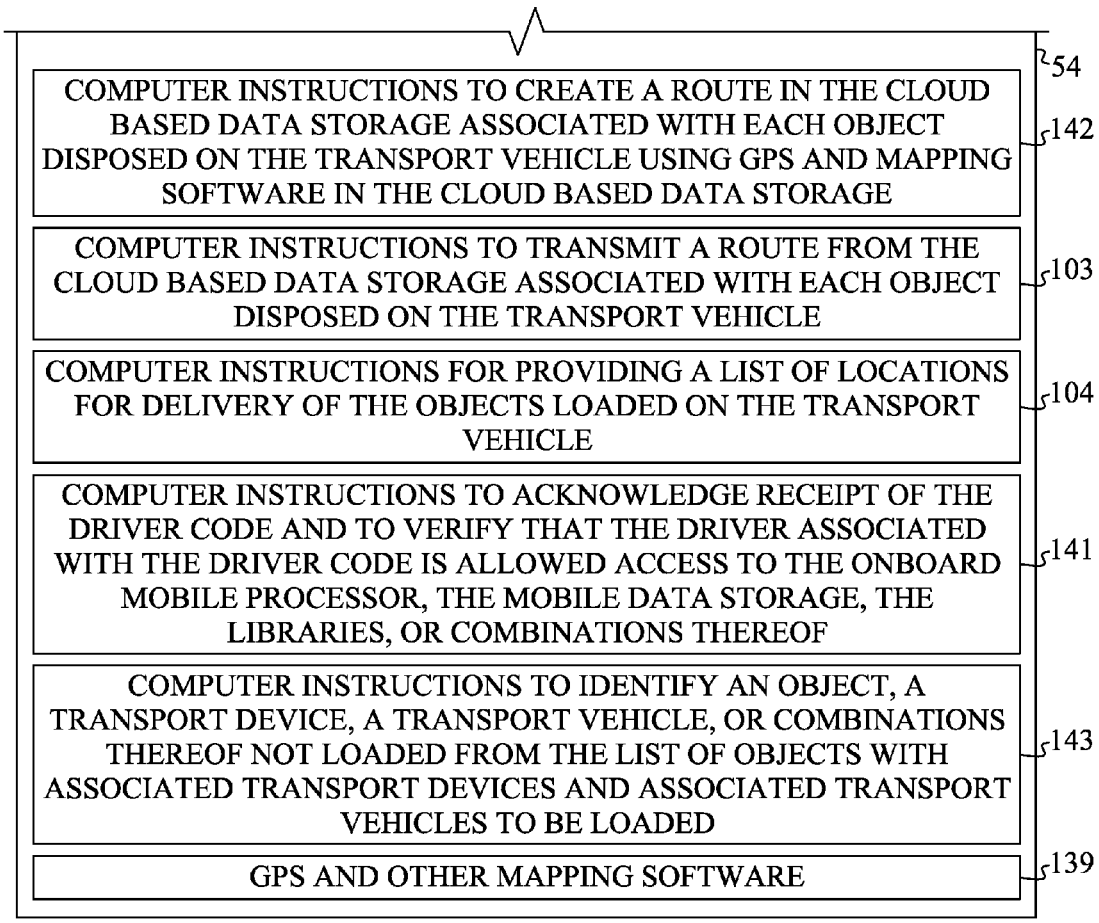

FIGS. 3A and 3B show an embodiment of a cloud based data storage 54 including the library 45.

The library 45 can include: the library of identifiable objects to be selected 56; the library of each first location associated with each object to be selected 58; the library of each second location associated with each first location 60; the library of operator information 62; the library of objects to be loaded 57; the library of transport devices 59; the library of authorized drivers 65; and the library of transport vehicles 61.

The cloud based data storage 54 can include computer instructions to receive a request from the mobile processor to obtain a list of objects to be selected 64; computer instructions to compile the list of objects to be selected based on the request using the libraries in the cloud based data storage 66; computer instructions to transmit the list of objects to be selected from the cloud based data storage to the mobile data storage 67; object information 86; computer instructions to acknowledge the operator code and verify that the operator associated with the operator code may have access to the mobile processor and the libraries 90; and computer instructions to indicate to the mobile processor at least one location for delivery of objects selected from the list of objects to be selected 138.

FIG. 3B is a continuation of FIG. 3A.

The cloud based data storage 54 can include GPS and other mapping software 139.

The cloud based data storage 54 can include computer instructions to acknowledge receipt of the driver code and to verify that the driver associated with the driver code is allowed access to the onboard mobile processor, the mobile data storage, the libraries, or combinations thereof 141; computer instructions to create a route in the cloud based data storage associated with each object disposed on the transport vehicle using GPS and mapping software in the cloud based data storage 142; and computer instructions to identify an object, a transport device, a transport vehicle, or combinations thereof not loaded from the list of objects with associated transport devices and associated transport vehicles to be loaded 143.

The cloud based data storage 54 can include computer instructions to transmit a route from the cloud based data storage associated with each object disposed on the transport vehicle 103, and computer instructions 104 for providing a list of locations for delivery of the objects loaded on the transport vehicle.

FIG. 4 depicts an object location identification trigger 74 sending a double click signal 76, a single click signal 78, and a hold signal 80 to the mobile processor 12.

The mobile processor 12 can be in communication with the cloud based server 51 which can in-turn be in communication with an external computer system 55 through the network 50.

A mobile printer 73 can be in communication with the mobile processor 12 for printing reports and lists or other data.

Figure 5:
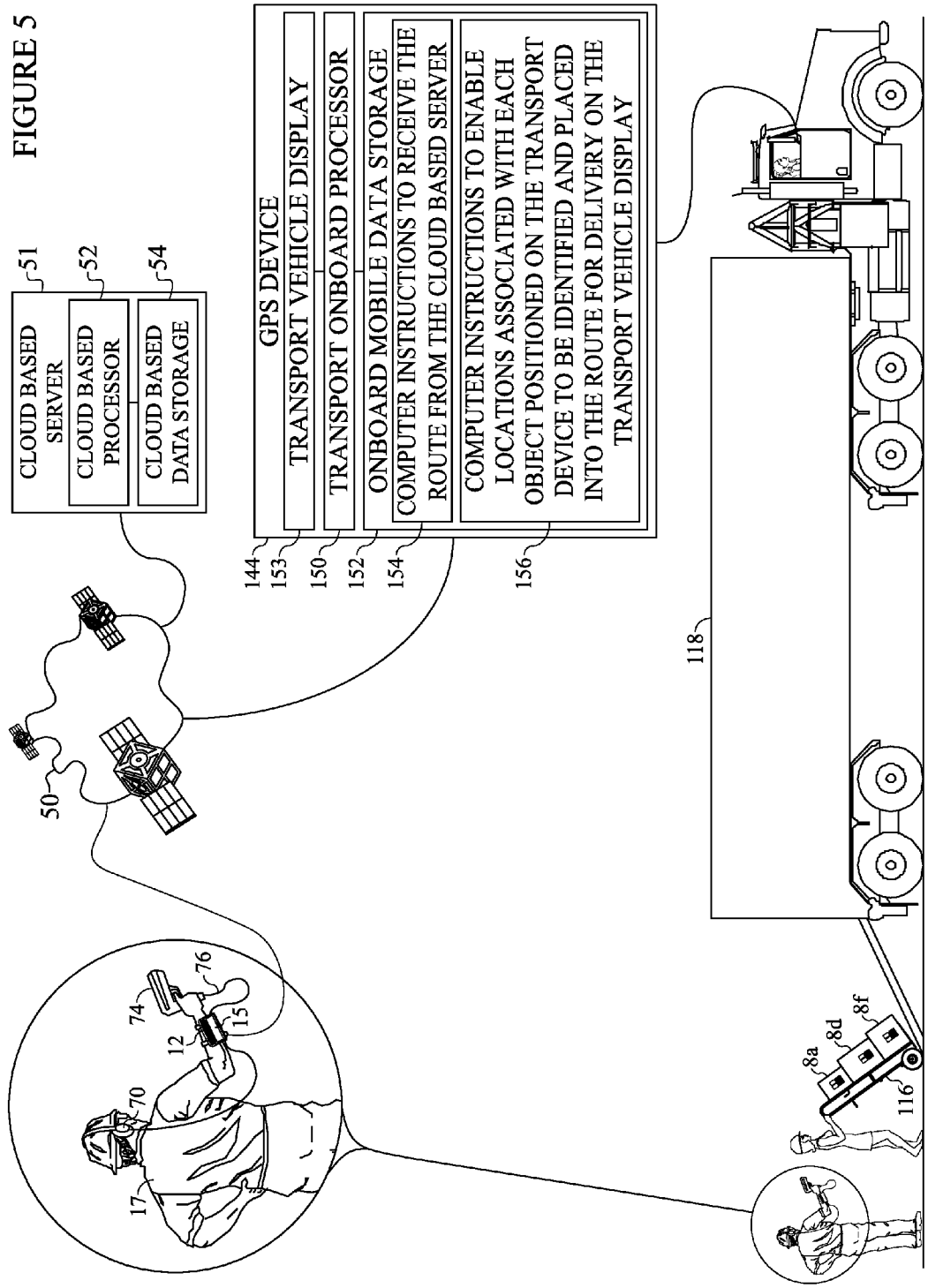
FIG. 5 shows an embodiment of loading and delivery components of the system that can be used to perform one or more embodiments.

FIG. 5 shows a transport vehicle 118 with a GPS device 144 and a transport onboard processor 150 with an onboard mobile data storage 152 and a transport vehicle display 153.

The transport onboard processor 150 can be in communication with the mobile processor 12 through the network 50.

An operator 17 is shown with an object location identification trigger 74 sending a double click signal 76 to the mobile processor 12.

Transport device 116 is shown with objects 8a, 8d, and 8f disposed thereon.

Computer instructions 154 are shown in the onboard mobile data storage to receive the route from the cloud based server.

Computer instructions 156 are also shown in the onboard mobile data storage to enable locations associated with each object positioned on the transport device to be identified and placed into the route for delivery on the transport vehicle display.

Figure 6:
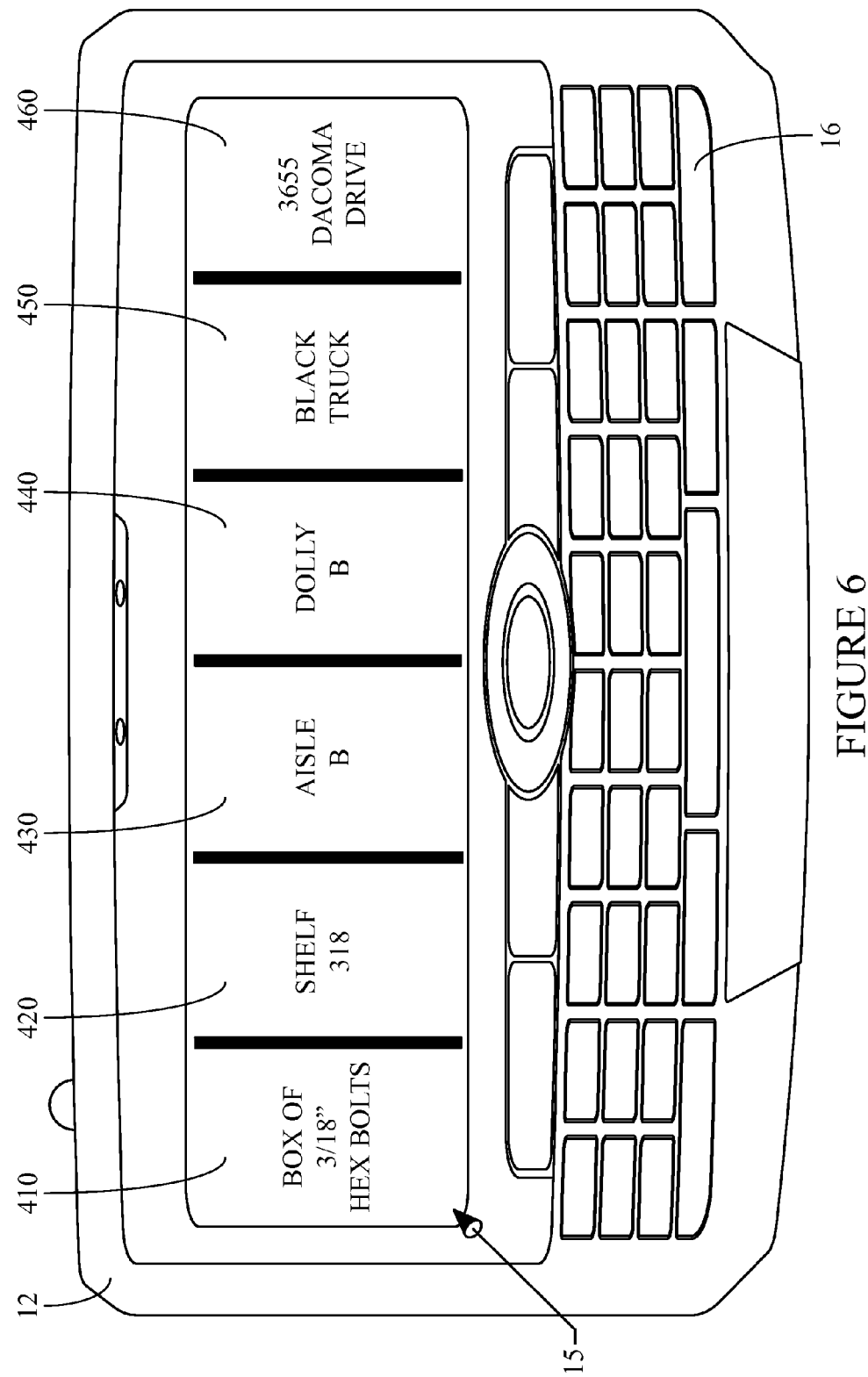
FIG. 6 shows an embodiment of commands on the display of the mobile processor that can be used to perform one or more embodiments.

FIG. 6 depicts an embodiment of the mobile processor 12 with the input device 16 and the display 15.

The display 15 can present various instructions and information related to an object to be selected, loaded, transported, and delivered.

In the example depicted, which is for illustrative purposes only, the object is a box of ⅜ inch hex bolts as shown by command 410. The location of the object is shelf 318 on aisle B as illustrated by commands 420 and 430. The object is to be loaded onto dolly B and then on the black truck as is illustrated by commands 440 and 450. The object is then to be delivered to 3655 Dacoma Drive as is illustrated by command 460.

Figure 7:
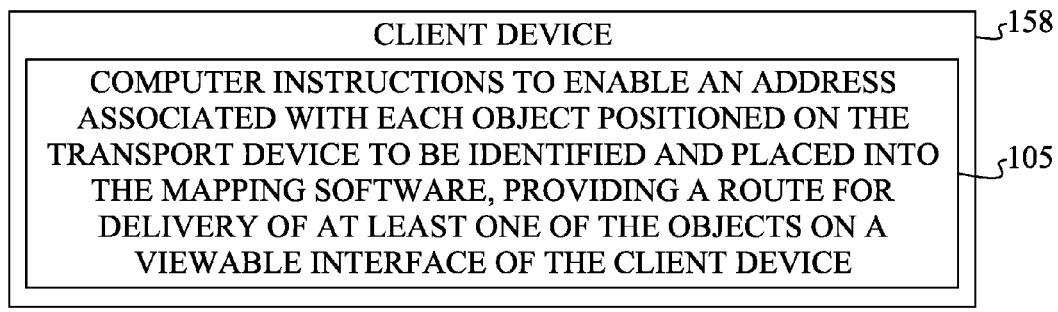
FIG. 7 shows an embodiment of a client device that can be used to perform one or more embodiments The present embodiments are detailed below with reference to the listed Figures.

FIG. 7 depicts an embodiment of the client device 158 with computer instructions to enable an address associated with each object positioned on the transport device to be identified and placed into the mapping software, providing a route for delivery of at least one of the objects on a viewable interface of the client device 105.

While these embodiments have been described with emphasis on the embodiments, it should be understood that within the scope of the appended claims, the embodiments might be practiced other than as specifically described herein.

What is claimed is:

1. A cloud computing system for performing a logistic operation, wherein the cloud computing system comprises:
   a. a computing cloud comprising one or more data storage units and one or more processing units, wherein the computing cloud is configured to provide at least one service and shared hardware and software resources;
   b. a mobile processor in communication with the computing cloud and a mobile data storage; and
   c. computer instructions stored in the computing cloud for transmission to the mobile processor wherein the computer instructions in the computing cloud comprise:
      (i) computer instructions to receive, verify, and store bar codes on at least one of the objects and computer instructions to receive, verify, and store bar codes related to a location proximate to at least one of the objects;
      (ii) computer instructions to receive, verify, and store RFID tag identifiers on at least one of the objects and computer instructions to receive, verify, and store an RFID tag related to the location proximate to at least one of the objects;
      (iii) computer instructions to receive, verify, and store alpha codes, numeric codes, or combinations thereof on at least one of the objects and computer instructions to receive, verify, and store alpha codes, numeric codes, or combinations thereof related to the location proximate to at least one of the objects;

(iv) computer instructions to provide a first command to an operator associated with the mobile processor to identify a member of the group consisting of:
at least one of the objects, the location of at least one of the objects, and combination thereof;

(v) text-to-speech computer instructions enabling the mobile computer to translate text commands to audio commands for the operator;

(vi) computer instructions in the computing cloud comprising a member of the group consisting of:
1. a library of identifiable objects to be selected;
2. a library of locations associated with each object to be selected;
3. a library comprising operator information;
4. a library of objects to be picked, loaded, delivered, or combinations thereof;
5. a library of transport devices;
6. a library of transport vehicles; and
7. combinations thereof;

(vii) computer instructions to receive a request from the mobile processor to obtain a list of objects to be selected;

(viii) computer instructions to compile a list of objects to be selected based on a request using libraries in the computing cloud; and (ix) computer instructions to transmit the list of objects to a member of the group comprising:
1. an audio output device in communication with the mobile processor;
2. a display in communication with the mobile processor; or
3. combinations thereof.

2. The cloud computing system of claim 1, further comprising a mobile input device in communication with the mobile processor, wherein the mobile input device is a member of the group consisting of: a keyboard, a touch screen, an object identification trigger, or combinations thereof.

3. The cloud computing system of claim 2, wherein the mobile input device is a three dimensional spatial coordinate sensor to allow the operator to communicate object information by using a physical motion of the input device to the mobile processor, wherein the object information comprises a dimension of the object, or a three dimensional spatial coordinate of the object, and wherein the object information further includes at least one of the following:
a. a yes answer;
b. a no answer;
c. a request to repeat a command;
d. an indication that a task is a completed task;
e. an indication that the operator is communicating at least one statement that is a member from a group consisting of:
(i) cannot find the object;
(ii) cannot find the first location;
(iii) cannot find second location; or
(iv) combinations thereof; and
f. an alpha code, a numeric code, or combinations thereof.

4. The cloud computing system of claim 2, wherein the object location identification trigger comprises at least one of:
a. a button on a wearable scanner, or an optical reader, or an RFID reader, or a bar code reader;
b. a trigger on a wearable scanner, or an optical reader, or an RFID reader, or a bar code reader;
c. an actuator on a wearable scanner, or an optical reader, or an RFID reader, or a bar code reader; or
d. combinations thereof.

5. The cloud computing system of claim 1, further comprising computer instructions in the computing cloud to prepare a summary of objects to be selected and categorized by the location of each object and with an indication of a quantity of each object at each location.

6. The cloud computing system of claim 1, further comprising computer instructions in the computing cloud to obtain, store, and display status information on a successful completion of selection of the objects on the list of objects to be selected that is an indication of the operator's performances compared to an expected completion time for completing selection of the objects on the list of objects to be selected.

7. The cloud computing system of claim 1, further comprising computer instructions in the computing cloud for providing an alert to the operator that one of the objects on the list of objects to be selected is a catch weight item by using the text-to-speech computer instructions.

8. The cloud computing system of claim 7, further comprising computer instructions in the computing cloud for recording the number and weight of the catch weight item.

9. A computer implemented method for performing a logistic operation, wherein the method comprises:
a. connecting to a computing cloud using a mobile processor in communication with a mobile data storage wherein the computing cloud comprising one or more data storage units and one or more processing units, wherein the computing cloud is configured to provide at least one service and shared hardware and software resources; and
b. communicating instructions to an operator from the computing cloud to the mobile processor to instruct an operator to perform a logistics operation, wherein the logistic operation comprises one or more of object location, object identification, object picking, object picking by line, object loading onto one or more transport devices, and object delivery, and wherein the mobile processor is configured to receive predefined responses from the operator in response to the instructions communicated to the operator, wherein the mobile processor is configured to receive the predefined responses from an object location identification trigger in communication with the mobile processor, wherein the predefined responses are:
(i) a double click signal as a response that informs the mobile processor that the operator has completed the command;
(ii) a single click signal as a response that informs the mobile processor to repeat the most recent command; and
(iii) a hold signal as a response that informs the mobile processor that the operator wants to scan a bar code, an RFID tag, an alpha code, a numeric code, or combinations thereof, on at least one object location, on at least one object, on at least one loading device, on at least one delivery device using the input device.

10. The method of claim 9, wherein the object location identification trigger comprises at least one of:
a. a button on a wearable scanner, or an optical reader, or an RFID reader, or a bar code reader;
b. a trigger on a wearable scanner, or an optical reader, or an RFID reader, or a bar code reader;
c. an actuator on a wearable scanner, or an optical reader, or an RFID reader, or a bar code reader; or
d. combinations thereof.

11. The method of claim 9, further comprising transferring information between the mobile processor, the cloud based processor, at least one external computer system, or combinations thereof, via a network.

12. The method of claim 9, wherein the mobile processor is in communication with at least one input device, and wherein the input device is a member of the group consisting of: a keyboard, a touch screen, and combinations thereof.

13. The method of claim 12, wherein the at least one input device is a three dimensional spatial coordinate sensor to allow the operator to communicate object information by using a physical motion of the input device to the mobile processor, wherein the object information comprises a dimension of the object, or a three dimensional spatial coordinate of the object, and wherein the object information further includes at least one of the following:

a. a yes answer;
 b. a no answer;
 c. a request to repeat a command;
 d. an indication that a task is a completed task;
 e. an indication that the operator is communicating at least one statement that is a member from the group consisting of:
   (i) cannot find the object;
   (ii) cannot find the first location;
   (iii) cannot find the second location; or
   (iv) combinations thereof; and
 f. an alpha code, a numeric code, or combinations thereof.

14. The method of claim 9, further comprising verifying a provide operator code to ensure that the operator has authority to use the mobile processor.

15. The method of claim 9, further comprising preparing a summary of objects to be selected and categorized.

16. The method of claim 9, further comprising receiving information by the mobile computer that the operator has picked short and transmitting from the mobile computer a third command to the output device for the operator to indicate a quantity of selected objects that is less than a quantity of objects indicated on the list of objects to be selected.

17. The method of claim 9, further comprising allowing the operator to enter and store a reason the operator picked short, a reason the quantity of selected objects is less than the quantity of objects indicated on the list of objects to be selected, or combinations thereof.

18. The method of claim 9, further comprising using computer instructions in the mobile processor to provide an alert to the operator that one of the objects on the list of objects to be selected is a catch weight item.

19. The method of claim 9, further comprising recording the number and weight of the catch weight item.

20. The method of claim 9, further comprising providing a high quantity item alert to the operator.

* * * * *